April 8, 1924.
C. W. STALLING
METHOD OF RECORDING AND DEPICTING MOTION PICTURES
Filed May 4, 1923
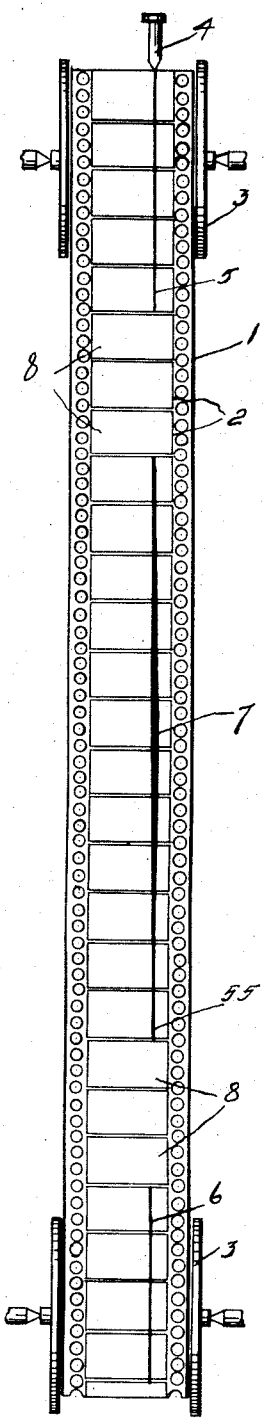
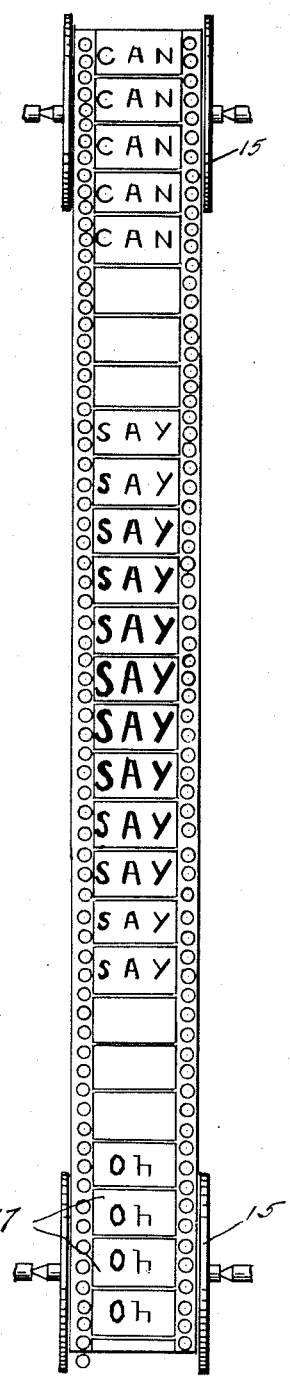
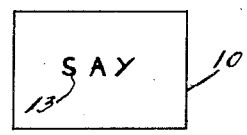
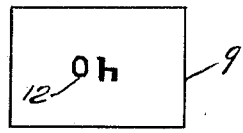
INVENTOR
Carl W. Stalling
BY
M. C. Gillham
ATTORNEY Patented Apr. 8, 1924.

1,489,794

UNITED STATES PATENT OFFICE.

CARL W. STALLING, OF KANSAS CITY, MISSOURI.

METHOD OF RECORDING AND DEPICTING MOTION PICTURES.

Application filed May 4, 1923. Serial No. 636,769.

*To all whom it may concern:*

Be it known that I, CARL W. STALLING, a citizen of the United States, residing at Kansas City, in the county of Jackson and State of Missouri, have invented certain new and useful Improvements in Methods of Recording and Depicting Motion Pictures, of which the following is a specification.

My invention relates to moving pictures.

It is my experience that, heretofore, moving picture films for depicting the words of a song upon a screen, a number of words, a line of words, or a verse of the song, is thrown upon the screen without synchronizing the duration and expression of the individual musical tones or notes of the song with the duration of the appearance of the individual words of the song.

The object of the invention is to provide a method for making moving picture films bearing individual words of a song to be projected upon a screen, one at a time, and to appear thereon synchronously with the duration of the musical tone or note of the song.

A further object of the invention is to provide a method for making moving picture films bearing individual words to be projected upon a screen, one at a time, and to appear thereon synchronously with the musical tone or note and the volume of expression of the same, by means of differentiating degrees of light.

In order that the invention may be understood reference is made to the accompanying drawing in which—Figure 1, is a plan view of a recording film embodying my invention, and used for producing a negative film bearing individual words of a song; Figure 2, is a plan view of a negative film produced by my method: Figure 3, is a plan view of a drawing of a song word to be produced on the negative film; Figure 4, is a plan view of another word to be produced on the negative film; Figure 5, is a plan view of still another word to be produced on the negative film and, Figure 6, is an elevation of a modified form of marker for recording the lines of duration and expression of musical tones or notes by indicating the expression by parallel lines.

Similar numerals of reference refer to corresponding parts throughout the several views.

The numeral 1, designates a negative motion picture film having the customary frames 2, and which is run through a projector machine, over winding reels 3. A marker 4, made of any suitable tracing substance adapted for marking the film while it is moving from one to the other of the reels, is held in close proximity to the film to be manipulated by hand or otherwise to contact the film and leave thereon a line or mark. If the musical tone or note to be recorded on the film is without expression, a light contact of the marker with the film is had and a light thin line recorded, as shown at 5 and 6, and if the musical tone or note is played or sung with expression, the pressure on the marker is increased, whereupon, the flexible film will be measurably depressed by the marker and a line of variable width recorded, as shown at 7. The length of the lines recorded denotes duration of the sustained musical tone or note, and the broadening of the line recorded denotes volume of expression of the same. The rest or pause between the musical tones or notes is timed by the number of film frames bearing no record, as shown at 8. On the drawings 9, 10 and 11, are shown, reading upward, the first three individual words of a song— "Oh", shown at 12, "Say", shown at 13, and "Can", shown at 14. The words individually quoted are produced upon a negative motion picture film traveling over reels 15, of a picture projector machine, the operator being guided in the making of the negative film by the record film, as will be hereinafter fully explained.

To produce a negative motion picture film bearing individual words of a song synchronized with the duration and volume of expression of the musical tone or note associated with the word to be sung, a suitable blank motion picture film having the customary picture frame thereon is run through the motion picture projector machine and, as the film travels, the marker 4, is held in readiness to make contact with the film. If the duration of an expressionless tone or note is to be recorded on the recording film, a light contact of the marker is made with the film, the contact beginning simultaneously with the beginning of the musical tone or note and, thereafter, maintained with uniform pressure until the ending of the musical tone or note. The length of the record thus made indicates the duration of the individual tone or note. In making a record on the recording film the line produced traverses a number of the picture frames of the film, and the frames mentioned are a guide for the operator in producing a negative film bearing pictured individual words of the song. If the musical tone or note is played or sung with varying degrees of volume of expression, the pressure of the contact of the marker on the film is gradually increased with the increased volume of expression of the musical tone or note and decreased with the decreasing volume of expression of the same, which variable pressure of contact produces a record like the one shown at 7. The length of the line recorded on the recording film denotes the duration of the musical tone or note and, the number of frames traversed by the line determines the number of frames upon the negative film to bear the pictured individual song word associated with such tone or note. If the tone or note is played with uniform expression the individual song words are produced on the negative film with uniform size, density, and degrees of light, and if the note is soft, the word is shown dimly, but if hard and loud, then shown more prominently. If the record of the musical tone or note is characterized by varying degrees of volume of expression, the individual words on the negative film are made to appear with variable size, density, or prominence.

To make the negative film the operator uses the recording film as a guide. In this instance, the first word of the song to be represented—"Oh" is photographed on a series of four frames of the negative film, as shown at 17, the series of frames numbering with the series of frames traversed by the record line 6, on the recording film. The record line mentioned being uniform in width the song word "Oh" is photographed throughout with the same size, density, and prominence. Then the negative film is advanced three blank frames to indicate the rest or pause between the musical tones or notes, corresponding in this respect with the three blank frames on the recording film for the same purpose. Then the next song word "Say," on the drawing 13, is photographed upon the next twelve frames of the negative film, the series of frames having the pictured word "Say" corresponding with the series of frames on the recording film traversed by the record line 55, the length of the series of words on the negative film indicating the duration of the musical tone or note for the word "Say." The record line 55, on the recording film not being uniform in width, but being swelled or broadened to indicate volume of expression of the tone or note, the song word "Say" is produced on the negative film with differentiating degrees of light, size, density, or prominence, corresponding with the increase or decrease in the width of the line 55, to synchronize the appearance of the song word on the screen with the duration and expresion of the musical tone or note as recorded on the recording film. Then the word "Can," on the drawing 14, is next photographed upon a series including the next four frames of the negative film, the number frames corresponding with the number of frames on the recording film and traversed by the record line 5, which line being of uniform width, the words "Can" are all produced on the frames mentioned with the same degree of focused light and have the same size, and density. The negative film is then advanced as before a distance of three blank frames, to indicate the rest or pause between the tones or notes, and then the next word of the song is produced on the negative film corresponding with the record thereof on the recording film, and, thereafter, the method is continued until the whole song is shown on the negative film.

The method of throwing the words of a song, one at a time, on the screen with the appearance of each word timed or synchronized with its musical tone or note, in duration and volume of expression, makes it possible for an orchestra or musician to follow the words of the song displayed with the same ease and accuracy as when led by a musical director Having described my invention what I claim is—

1. The method of producing and depicting motion pictures, consisting in marking on a suitable traveling recording medium synchronously with the sounding of a musical tone a record of the duration of the tone and by manipulating the marking element to expand the record mark synchronously with the increasing and decreasing of the volume of expression of the tone, and then picturing on a negative motion picture film a series of pictures of an individual picture, the series corresponding in length with the length of the record line of duration on the recording medium, the volume of expression of the tone being indicated by differentiating magnitudes of the picture, whereby the pictures produced may be projected upon a screen to direct the playing or singing of the music.

2. The method of producing and depicting motion pictures, consisting in marking on a traveling motion picture film synchronously with the sounding of a musical tone a record of the duration of the tone measured in length by the number of frames on the film traversed by the record and by manipulating the marking element to expand the record line synchronously with and in conformity to the increasing and decreasing volume of expression of the tone, and then picturing on the frames of a negative motion picture film equal in number with the frames traversed by the record line on the recording medium a series of pictures of an individual picture to thereby synchronize the appearance of the picture on the screen with the duration of the tone, the volume of expression of the tone being synchronized with the record thereof on the recording medium by differentiating magnitudes of the pictures, whereby the picture may be projected upon a screen to direct the playing or singing of music.

Kansas City, Missouri, April 30th, 1923.

CARL W. STALLING.

Witnesses:
W. L. McSPADDEN,
GEO. W. ANGUS.